United States Patent [19]

Reuter

[11] 4,335,771
[45] Jun. 22, 1982

[54] TIRE WITH A REINFORCING BELT STRUCTURE

[75] Inventor: Rene F. Reuter, Warken, Luxembourg

[73] Assignee: The Goodyear Tire & Rubber Company, Akron, Ohio

[21] Appl. No.: 230,566

[22] Filed: Feb. 2, 1981

[51] Int. Cl.³ .............................................. B60C 9/20
[52] U.S. Cl. ...................... 152/361 FP; 152/361 DM; 152/361 R
[58] Field of Search ...... 152/361 R, 361 FP, 361 DM

[56] References Cited

U.S. PATENT DOCUMENTS 3,881,538  5/1975  Mirtain ......................... 152/361 FP

FOREIGN PATENT DOCUMENTS 2453892  5/1976  Fed. Rep. of Germany ...... 152/361 FP
1435170  3/1966  France ........................... 152/361 FP

*Primary Examiner*—Edward C. Kimlin
*Assistant Examiner*—Lois E. Boland
*Attorney, Agent, or Firm*—Frank Pincelli

[57] ABSTRACT

A tire with a reinforcing belt structure comprising three plies. The inner and outer plies each have a main body portion and a single folded end portion. The main body portions of the inner and outer plies have substantially the same width. The cords of the inner and outer plies have the same orientation with respect to the mid-circumferential centerplane of the tire. The folded end portion of each of the inner and outer plies is disposed radially outwardly of its respective main body portion. The inner and outer plies are arranged in such a way that the unfolded lateral end portion of the main body ply of the radially outer ply is enclosed by the bight of the radially inner ply. A middle unfolded ply is interposed between the main body portion of the inner and outer plies and comprises cords which are oriented with respect to the mid-circumferential centerplane of the tire in the direction opposite to the cords of the adjacent folded plies. The cords of the folded plies are made preferably of steel and the cords of the middle unfolded ply are made preferably of a high modulus non-metallic material.

10 Claims, 5 Drawing Figures

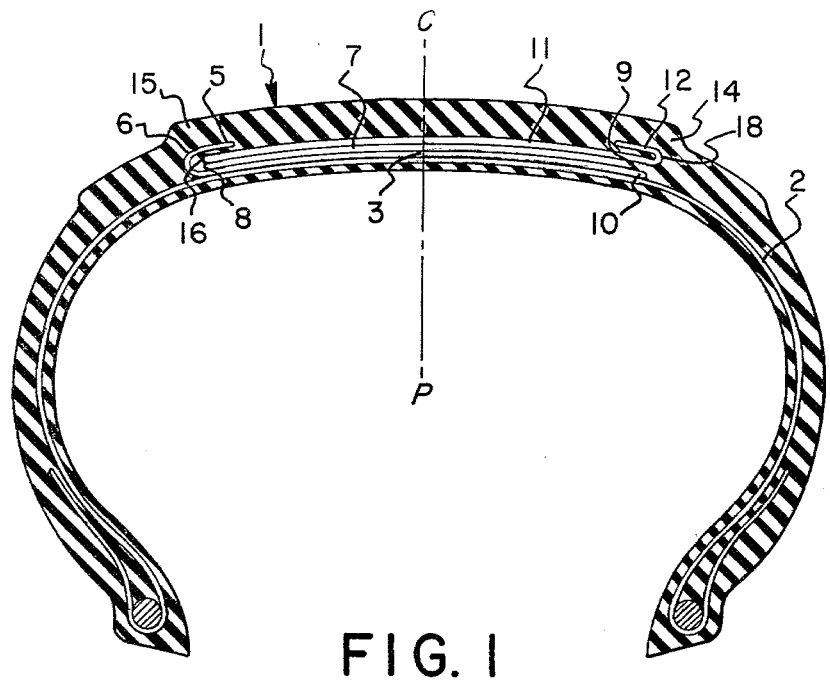
FIG. 1
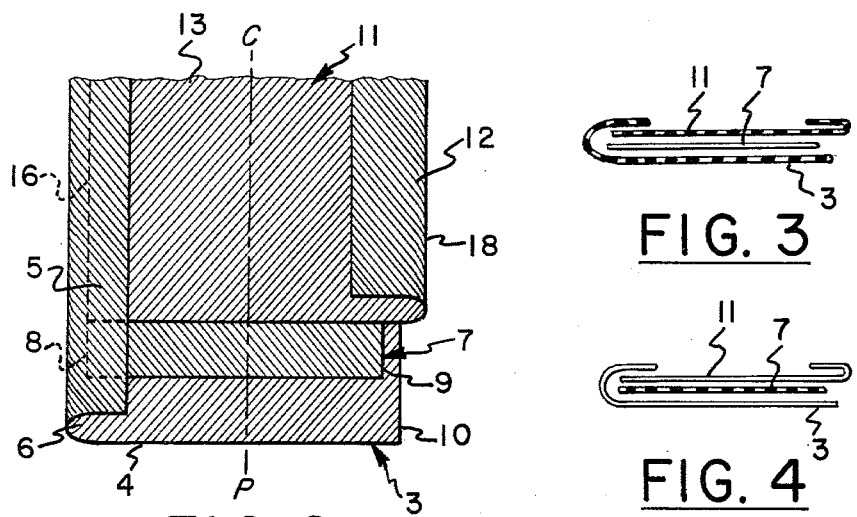
FIG. 2
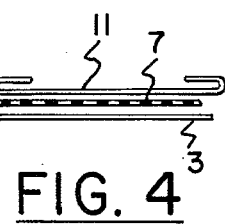
FIG. 3
FIG. 4
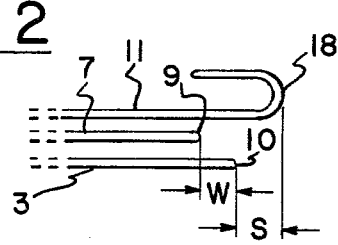
FIG. 5

TIRE WITH A REINFORCING BELT STRUCTURE

The foregoing abstract is not to be taken as limiting the invention of this application, and in order to understand the full nature and extent of the technical disclosure of the application, reference must be made to the accompanying drawings and the following detailed description.

The invention relates to a tire with a reinforcing belt structure, and more particularly to a reinforcing belt structure which comprises two folded belt plies folded in the same radially outward direction. The main body portions of these plies are of substantially equal width and the unfolded end of the main body portion of the radially outer ply lies within the space formed by the fold of the radially inner ply.

For the purposes of this invention, a folded belt ply is a ply which is folded along a fold line to form a skirting which is substantially less than the width of the main body portion of the ply which has not been folded. Generally, the skirting is in the range of approximately 1/5 to ⅓ of the width of the main body portion. Hereinafter the skirting will be called the folded end portion of the ply, whereas the rest of the ply will be called the main body portion of the ply.

Belt structures having two folded belt plies are known in the prior art and are exemplified by German DOS 24 53 892. These structures are placed in the crown region of the tire between the carcass structure and the tread band. The folds of the plies are located in the shoulder regions of the tire. The first ply as seen from the carcass toward the tread, that is, the radially innermost ply with respect to the axis of rotation of the tire, forms the fold which envelops the unfolded end of the main body portion of the second ply, that is, the radially outermost ply. As a consequence of the folded ends of the plies, a three ply layer assembly is formed in the border regions of the belt structure. Where the belt plies comprise cords, it is common for the cords of each ply to extend relative to the mid-circumferential centerplane of the tire at an angle or sign opposite to that of any next adjacent ply, thus in one border region of the belt structure, the cords of the plies run alternately in opposite directions, whereas in the other border region, the cords of the two outer plies run necessarily in the same direction. This makes one border region stiffer than the other and causes uneven tread wear.

The present invention provides a belt structure with a symmetrical orientation of cords in the border regions whereby the disadvantage mentioned above is avoided.

SUMMARY OF THE INVENTION

The invention is characterized in that the cords of the two folded plies have the same cord orientation with respect to the mid-circumferential plane of the tire, and that an unfolded ply of oppositely oriented cords and of a width substantially equal to the main body portions of the folded plies is interposed between the main body portions of the folded plies. Preferably, the cords of the unfolded middle ply are composed of a material which is different from the cords of the folded plies. Whereas the folded plies, for reasons of symmetry, have to be made of the same material, the third ply can be made of a different material for reasons of tire handling characteristics, tire weight and economics.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

DESCRIPTION OF THE DRAWINGS

FIG. 1 is a cross-sectional view of a pneumatic tire embodying a belt reinforcing structure made in accordance with the present invention; and FIG. 2 is a fragmentary plan view of the belt structure of FIG. 1 in which some parts are broken away to show the direction of the ply cords; and FIGS. 3 and 4 are diagrammatical representations of the preferred embodiments of the belt reinforcing structure of the present invention; and FIG. 5 is an enlarged fragmentary cross-sectional view of a lateral region of the belt structure of FIG. 1.

DETAILED DESCRIPTION OF THE INVENTION

Referring to FIG. 1, there is illustrated a pneumatic tire 1 which comprises a carcass, preferably of the radial type wherein the cords 2 of the carcass lie at an angle in the range of 70° to 90° with respect to the mid-circumferential centerplane of the tire 1. In the particular embodiment illustrated, the carcass is illustrated as comprising one ply, however, the carcass may have any desired number of plies. Over the radially outer peripheral region of the carcass is placed a first folded ply 3, which extends circumferentially about the tire. Folded ply 3 comprises a main body portion 4 and a folded end portion 5 which is folded radially outwardly of the main body portion 4 forming bight 6. The width of the folded end portion 5 lies in the range of 1/5 to ⅓ of the width of the main body portion 4. The cords of ply 3 lie at an angle between 15° and 25° with respect to the mid-circumferential plane CP of the tire. The main body portion 4 of belt ply 3 extends substantially across the width of the ground-engaging tread portion of the tire, generally terminating in shoulder regions 14 and 15.

The belt structure further includes an unfolded belt reinforcing ply 7 which is placed radially outwardly with respect to the axis of rotation of the tire from the first folded ply 3. The width of the ply 7 is substantially equal to the width of the main body portion 4 of ply 3. The lateral edge 8 of the ply 7 which is adjacent to the folded end portion 5 lies within the bight 6. The other lateral edge 9 of ply 7 extends to within approximately 10 mm of the lateral edge 10 of ply 3 giving staggered endings of plies 3 and 7. The cords of ply 7 preferably lie at an angle of between 15° and 35° with respect to the mid-circumferential plane of the tire.

The belt structure further comprises a third ply 11 which is disposed radially outwardly with respect to the axis of rotation of the tire to ply 7. The ply 11 has one end 12 folded radially outwardly back upon the main body portion 13 of ply 11. The width of the folded end portion 12 lies in the range of 1/5 to ⅓ of the width of the main body portion 13. The width of the main body portion 13 is substantially equal to the width of ply 7. The folded end portion 12 of ply 11 is situated in the shoulder 14 axially opposite to shoulder 15 in which the folded end portion 5 of ply 3 is situated. The lateral edge 16 of the main body portion 13 of ply 11 extends into bight 6. The axially outer edge 18 of folded end portion 12 of ply 11 extends axially outwardly beyond the edge 10 of the main body portion 4 of ply 3 a distance of approximately 5 mm.

The cords of ply 11 lie at an angle of between 15° and 25° to the mid-circumferential centerplane CP of the tire.

In the particular embodiment illustrated, the cords of plies 3 and 11 lie at an angle of about 20° and the cords of the belt ply 7 lie at an angle of approximately 25°.

Referring to FIG. 2, there is shown a plan view of the belt structure of the invention illustrating the relative angles of orientation of the different cords with respect to the mid-circumferential centerplane CP. FIG. 2 illustrates quite clearly that the cords of the main body portion 4 of ply 3, unfolded ply 7, and main body portion 13 of ply 11 run in the relationship right-left-right, respectively. A right-oriented ply is a ply which to an observer placed outside the tire has cords running in a direction contained within the first and third quadrant defined by two Cartesian axes. Similarly a left-oriented ply is a ply which to an observer placed outside the tire has cords running in a direction contained within the second and fourth quadrant defined by two Cartesian axes. The former orientation is also sometimes referred to as a Z orientation, whereas the latter orientation is called a S orientation. In the border regions of the belt structure where the folded end portions 5 and 12 are located the cords beginning from the first ply 3 continuing radially outwardly to the folded portions run in the relationship of right-left-right-left, respectively. It is understood that the present invention is not limited to the above relationship, but may have the alternative relationship, for example, left-right-left in the central portion of the belt structure and left-right-left-right in the border regions.

In a preferred embodiment of the invention, the material used for the cords of the unfolded ply 7 is different from the material of the cords of plies 3 and 11.

FIGS. 3 and 4 illustrate the belt structure wherein the cords of middle ply 7 are made of a material different from that of the cords of plies 3 and 11. FIG. 3 illustrates the use of metal cords preferably steel cords, for folded plies 3 and 11. The unfolded ply 7 comprises cords composed of a high modulus non-metallic fiber. The unfolded plies can also comprise relatively fine steel cords as opposed to the coarser steel cords of the folded plies.

Alternatively, FIG. 4 illustrates a structure wherein the unfolded ply 7 comprises cords of steel, while folded plies 3 and 11 comprise cords of a high modulus non-metallic fiber. Folded plies 3 and 11 can also comprise relatively fine steel cords as opposed to the coarser steel cords used for the unfolded ply 7.

The following materials are examples of high modulus non-metallic fibers which could be used in the manufacture of cords: aramid, fiberglass, carbon, silicon, and boron. The present invention however is not limited to the use of these materials.

Reference is now being made to FIG. 5. To avoid piled ply endings, whereby edges 18 and 10 of respective plies 11 and 7 would be contained in the same circumferential plane, it is preferred that the axially outer edge 18 of folded end portion 12 extends axially beyond the free edge 10 of ply 3 a distance S, the distance S being within the range of about 5 mm to 10 mm, depending on the type of tire construction. It is a further advantage if the edge 9 of ply 7 which is situated next to the folded edge 18 of ply 11 does not extend axially beyond the edge 10 of ply 3. Preferably, the edge 9 is spaced axially inward from edge 10 a distance W. The distance W preferably lies within the range of 5 mm to 10 mm, depending on the type of tire construction.

We claim:

1. A tire with a reinforcing belt structure which comprises a first reinforcing folded belt ply, said first folded belt ply comprising a main body portion and a single folded end portion disposed radially outwardly with respect to the axis of rotation of said tire of said main body portion, a second reinforcing belt ply having a main body portion and a single folded end portion disposed radially outwardly with respect to the axis of rotation of said tire of said main body portion of said second ply, said second ply being disposed radially outwardly of said first ply and oriented such that the lateral end portion of the main body portion of said second ply lies within the space formed by the folded end portion of said first ply, characterized in that the cords of said first and second plies lie in the same orientation with respect to the mid-circumferential centerplane of the tire, a middle unfolded belt ply of oppositely disposed oriented cords and of a width substantially equal to the main body portions of said first and second plies is disposed between the unfolded portions of said first and second plies.

2. A tire according to claim 1 further characterized in that said first and second folded plies comprise cords made out of steel and said middle unfolded ply comprises cords made out of a high modulus non-metallic fibre.

3. A tire according to claim 1 further characterized in that said first and second folded plies comprise cords made out of a high modulus non-metallic fibre and that the middle unfolded ply comprises of cords made of steel.

4. A tire according to claim 1 further characterized in that said first and second folded plies comprise relatively fine steel cords and that said middle unfolded ply comprises steel cords of relatively coarse steel.

5. A tire according to claim 1 further characterized in that said first and second folded plies comprise relatively coarse steel cords and that said middle unfolded ply comprises cords of relatively fine steel.

6. A tire according to claims 1, 2, 3, 4 or 5 further characterized in that the distance separating the lateral edge of the unfolded end portion of said first folded ply and the folded edge of said second folded ply lies between 5 mm and 10 mm.

7. A tire according to claims 1, 2, 3, 4 or 5 further characterized in that the distance separating the edge of the unfolded middle ply, which is situated next of the folded edge of said second folded ply, and the edge of the unfolded end portion of said first folded ply lies between 5 mm and 10 mm.

8. A tire according to claims 1, 2, 3, 4 or 5 further characterized in that the orientation of the cords of the plies in the border regions of said reinforcing belt structure with respect to the mid-circumferential plane is left-right-left-right starting from the inner ply proceeding to the outer ply.

9. A tire according to claims 1, 2, 3, 4 or 5 further characterized in that the orientation of the cords of the plies in the border regions of said reinforcing belt structure with respect to the mid-circumferential plane is right-left-right-left starting from the inner ply proceeding to the outer ply.

10. The tire according to claims 1, 2, 3, 4 or 5 further characterized by radial reinforcing carcass structure.

\* \* \* \* \*